(12) United States Patent
San Martin et al.

(10) Patent No.: US 10,996,366 B2
(45) Date of Patent: May 4, 2021

(54) DETERMINING PERMEABLILITY BASED ON COLLAR RESPONSES

(71) Applicant: Halliburton Energy Services, Inc., Houston, TX (US)

(72) Inventors: Luis San Martin, Houston, TX (US); Reza Khalaj Amineh, Houston, TX (US); Burkay Donderici, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 376 days.

(21) Appl. No.: 15/755,431

(22) PCT Filed: Sep. 17, 2015

(86) PCT No.: PCT/US2015/050763
§ 371 (c)(1),
(2) Date: Feb. 26, 2018

(87) PCT Pub. No.: WO2017/048263
PCT Pub. Date: Mar. 23, 2017

(65) Prior Publication Data
US 2018/0259671 A1 Sep. 13, 2018

(51) Int. Cl.
*E21B 47/007* (2012.01)
*G01V 3/28* (2006.01)
(Continued)

(52) U.S. Cl.
CPC ............. *G01V 3/28* (2013.01); *E21B 47/002* (2020.05); *E21B 47/007* (2020.05); *E21B 47/13* (2020.05);
(Continued)

(58) Field of Classification Search
None
See application file for complete search history.

(56) References Cited

U.S. PATENT DOCUMENTS

| | | | |
|---|---|---|---|
| 4,292,588 | A | 9/1981 | Smith |
| 4,736,298 | A | 4/1988 | Easton et al. |

(Continued)

OTHER PUBLICATIONS

"Memory Magnetic Imaging Defectoscopy" Arbuzov, Bochkarev, Bargin, Maslennikova, Zagidullin, Achkeev, and Kirillov (Herein referred as Arbuzov et al) SPE 2012, pp. 1-10. (Year: 2012).*

(Continued)

*Primary Examiner* — Kibrom K Gebresilassie
(74) *Attorney, Agent, or Firm* — John Wustenberg; C. Tumey Law Group PLLC (57) ABSTRACT

A method for determining tubing permeability includes conveying a tool through a tubular string in a borehole. The tool includes a transmitter that transmits a primary electromagnetic field and a receiver that receives at least one collar response. The collar response includes a secondary electromagnetic field produced in response to the primary field by a collar in the tubular string. The method further includes determining a permeability of at least one portion of the tubular string based on a magnitude of the at least one collar response. The method further includes displaying a representation of the at least one portion of the tubular string based on the permeability.

17 Claims, 6 Drawing Sheets

(51) Int. Cl.
| | |
|---|---|
| G01V 3/30 | (2006.01) |
| E21B 47/002 | (2012.01) |
| E21B 47/13 | (2012.01) |
| E21B 49/08 | (2006.01) |
| G01V 3/34 | (2006.01) |
| G01V 3/38 | (2006.01) |
| G01N 17/04 | (2006.01) |
| E21B 47/092 | (2012.01) |
| E21B 47/12 | (2012.01) |

(52) U.S. Cl.
CPC .............. *E21B 49/088* (2013.01); *G01V 3/30* (2013.01); *G01V 3/34* (2013.01); *G01V 3/38* (2013.01); *E21B 47/092* (2020.05); *E21B 47/12* (2013.01); *E21B 49/081* (2013.01); *E21B 49/084* (2013.01); *G01N 17/04* (2013.01)

(56) References Cited

U.S. PATENT DOCUMENTS

| | | | |
|---|---|---|---|
| 5,260,661 | A | 11/1993 | Vail |
| 8,079,414 | B2 | 12/2011 | Smaardyk et al. |
| 8,201,625 | B2 | 6/2012 | Klmaguer |
| 8,362,780 | B2 | 1/2013 | Rosthal et al. |
| 8,704,523 | B2 | 4/2014 | Levesque et al. |
| 2006/0202700 | A1* | 9/2006 | Barolak ................ E21B 47/085 324/345 |
| 2009/0195244 | A1 | 8/2009 | Mouget et al. |
| 2011/0167914 | A1 | 7/2011 | Sutherland |
| 2011/0204896 | A1 | 8/2011 | Zhang et al. |
| 2011/0290011 | A1 | 12/2011 | Dowla et al. |
| 2011/0308789 | A1 | 12/2011 | Zhang et al. |
| 2014/0111209 | A1* | 4/2014 | Gao ........................ G01V 3/26 324/332 |
| 2014/0216734 | A1* | 8/2014 | Hupp ...................... E21B 47/13 166/255.1 |
| 2017/0101865 | A1* | 4/2017 | Khalaj Amineh ...... E21B 47/00 |
| 2018/0051554 | A1* | 2/2018 | Werkheiser ............. E21B 47/09 |
| 2018/0259671 | A1* | 9/2018 | San Martin ........... E21B 49/088 |
| 2018/0348396 | A1* | 12/2018 | Hou .......................... G01V 3/34 |
| 2019/0153856 | A1* | 5/2019 | San Martin ........... E21B 47/113 |

OTHER PUBLICATIONS

SPE 162054 Titled "Memory Magnetic Imaging Defectoscopy" by Arbuzov et al. dated Oct. 16, 2012.

IPTC 16997 Titled "Successful Application of a New Electromagnetic Corrosion Tool for Well Integrity Evaluation in Old Wells Completed with Reduced Diameter Tubular" by Garcia et al. dated Mar. 26, 2013.

International Search Report and Written Opinion for PCT/US2015/050763 dated May 20, 2016.

Vasic et al. "Stochastic Inversion Approach to Measurement of Tube Properties Using Remote Field Technique." 2011 IEEE International Instrumentation and Measurement Technology Conference. IEEE, 2011.

Zhong et al. "Multi-Pipe String Electromagnetic Detection Tool and Its Applications." 2007 8th International conference on Electronic Measurement and Instruments. IEEE, 2007.

Rourke et al. "Algorithm Development and Case Study for a 1-11/16" Pulsed Eddy Current Casing Inspection Tool. SPWLA 55th Annual Logging Symposium, May 18 2014.

Wu et al. "Theory and Application of Thickness Measurement Technique by Pulsed Eddy Current," Journal of Beijing Jiaotong University, 2009, China. Abstract only.

Wireline Logging Solutions formerly Allied Horizontal Wireline Services, "Magnetic Thickness Tool." 2014.

\* cited by examiner

DETERMINING PERMEABLILITY BASED ON COLLAR RESPONSES

BACKGROUND

Scaling, corrosion, precipitates, and material defects are some problems faced by the oil and gas industry when managing production well and pipeline assets. These problems lead to diminished production in wells, casing integrity failure, and pipeline integrity failure any of which may result in costly and complex remediation measures. As such, electromagnetic techniques are commonly used to monitor the condition of the production and intermediate casing strings, tubing, collars, filters, packers, and perforations.

One electromagnetic technique is the eddy current technique. In this technique, when a transmitter coil emits the primary electromagnetic field, or signal, eddy currents are produced in, e.g., the casing. These eddy currents then produce secondary fields, or signals, which are received by a receiver coil. When recorded and processed, this data can be employed to perform an evaluation of the casing.

However, the geometry of concentric casing strings, studded with collars at different depths, makes it difficult to process the received signals. A collar is a threaded tubular section used to connect two sections of casing. Thus, the casing string has larger thickness at each collar section. As such, the sections of casing surrounded by collars are typically ignored in the eddy current technique in favor of using the more homogenous non-collar sections of the casing string. However, such exclusion results in an incomplete set of data on which to base decisions.

BRIEF DESCRIPTION OF THE DRAWINGS

Accordingly, determining permeability based on collar responses is disclosed herein. In the following detailed description of the various disclosed embodiments, reference will be made to the accompanying drawings in which.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

NOTATION AND NOMENCLATURE

Certain terms are used throughout the following description and claims to refer to particular system components and configurations. As one of ordinary skill will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or a direct electrical or physical connection. Thus, if a first device couples to a second device, that connection may be through a direct electrical connection, through an indirect electrical connection via other devices and connections, through a direct physical connection, or through an indirect physical connection via other devices and connections in various embodiments.

DETAILED DESCRIPTION

The issues identified in the background are at least partly addressed by determining permeability based on collar responses. Accurate measurements of pipe thickness and pipe corrosion can be based on the permeability data, and corrosion monitoring can be especially useful to prevent pipe integrity failures in mature wells or non-producing wells. For example, corrosion damage typically decreases the thickness, and hence the conductivity, of casing strings. After transmitting an interrogation signal into the casing strings, the response received is proportional to conductivity, and also serves as an indicator of the remaining wall thickness. The response is also proportional to the permeability of the casing material, which is not constant. By measuring the permeability of the casing material at the collar, where the casing is much thicker, a more accurate measurement of casing conductivity and wall thickness of the casing walls between the collars may be determined.

Figure 1:
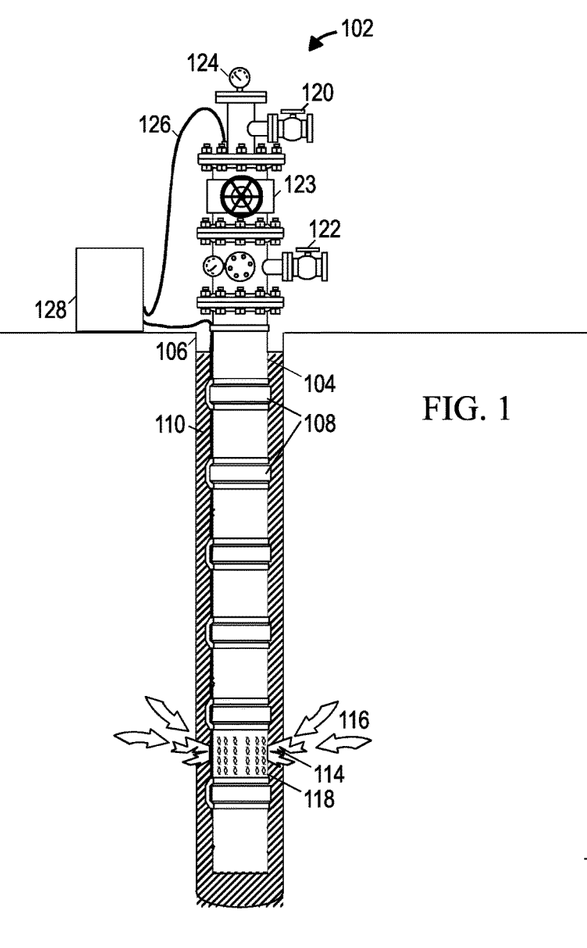
FIG. 1 is a contextual view of an illustrative production environment.

The disclosed systems and methods for determining such permeabilities are best understood in terms of the context in which they are employed. As such, FIG. 1 shows a well 102 including a casing string 104 positioned in a borehole 106 that has been formed in the earth by a drill bit. The casing string 104 includes multiple casing tubulars (usually 30-foot steel tubulars) connected end-to-end by collars 108. Cement 110 has been injected between an outer surface of the casing string 104 and an inner surface of the borehole 106, and the cement 110 has been allowed to set. The cement 110 enhances the structural integrity of the well 102 and seals the annulus around the casing 104 against undesired fluid flows. Though the well 102 is shown as entirely cemented, in practice certain intervals may be left without cement, e.g., in horizontal runs of the borehole where it may be desired to facilitate fluid flows.

Perforations 114 have been formed at one or more positions along the borehole 106 to facilitate the flow of a fluid 116 from a surrounding formation into the borehole 106 and thence to the surface. The casing string 104 may include pre-formed openings 118 in the vicinity of the perforations 114, or it may be perforated at the same time as the formation. Typically, the well 102 is equipped with a production tubing string positioned in an inner bore of the casing string 104. One or more openings in the production tubing string accept the borehole fluids and convey them to the earth's surface and onward to storage and/or processing facilities via a production outlet 120. The wellhead may include other ports such as a port 122 for accessing the annular space(s) and a blowout preventer 123 for blocking flows under emergency conditions. Various other ports and feed-throughs are generally included to enable the use of external sensors 124 and internal sensors. A cable 126 couples such sensors to a well interface system 128.

Figure 2:
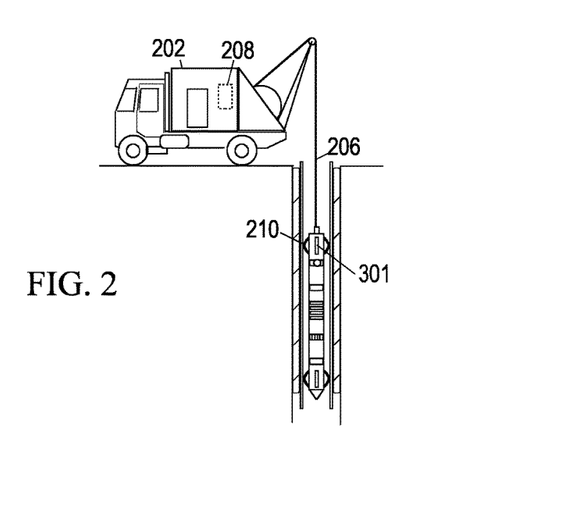
FIG. 2 is contextual view of an illustrative wireline embodiment.

FIG. 2 shows a contextual view of an illustrative wireline embodiment. A logging truck 202 suspends a tool 301, described in greater detail with respect to FIG. 3, on a wireline cable 206 having conductors for transporting power to the tool 301 and telemetry from the tool 301 to the surface. The tool 301 may be conveyed through the borehole at variable depths, speeds, and azimuthal orientations. On the surface, a computer 208 acquires and stores measurement data from the tool 301 as a function of position along the borehole and as a function of azimuth. The computer 208 can take different forms including a tablet computer, laptop computer, desktop computer, and virtual cloud computer, and executes software to carry out necessary processing and enable the user to view and interact with a display of the resulting information. Specifically, a processor coupled to memory and located at the surface may execute the software. The software may collect the data and Organize it in a file or database. The software may respond to user input via a keyboard or other input mechanism to display data as an image or movie on a monitor or other output mechanism such as a printer. In this way, a multi-dimensional representation of the surrounding formation, tubings, collars, and casing may be obtained, processed, and displayed. Furthermore, the software may issue an audio or visual alert to direct the user's attention to a particular location, result, or piece of data. The processor may perform any appropriate step described below. In at least one embodiment, the tool 301 itself may include the processor coupled with memory to obtain, store, and process measurement data taken by the sensors. In another embodiment, processors both at the surface and downhole may work together or independently to obtain, store, and process measurement data. Centralizers 210 keep the tool 301 centered within the borehole.

Figure 3:
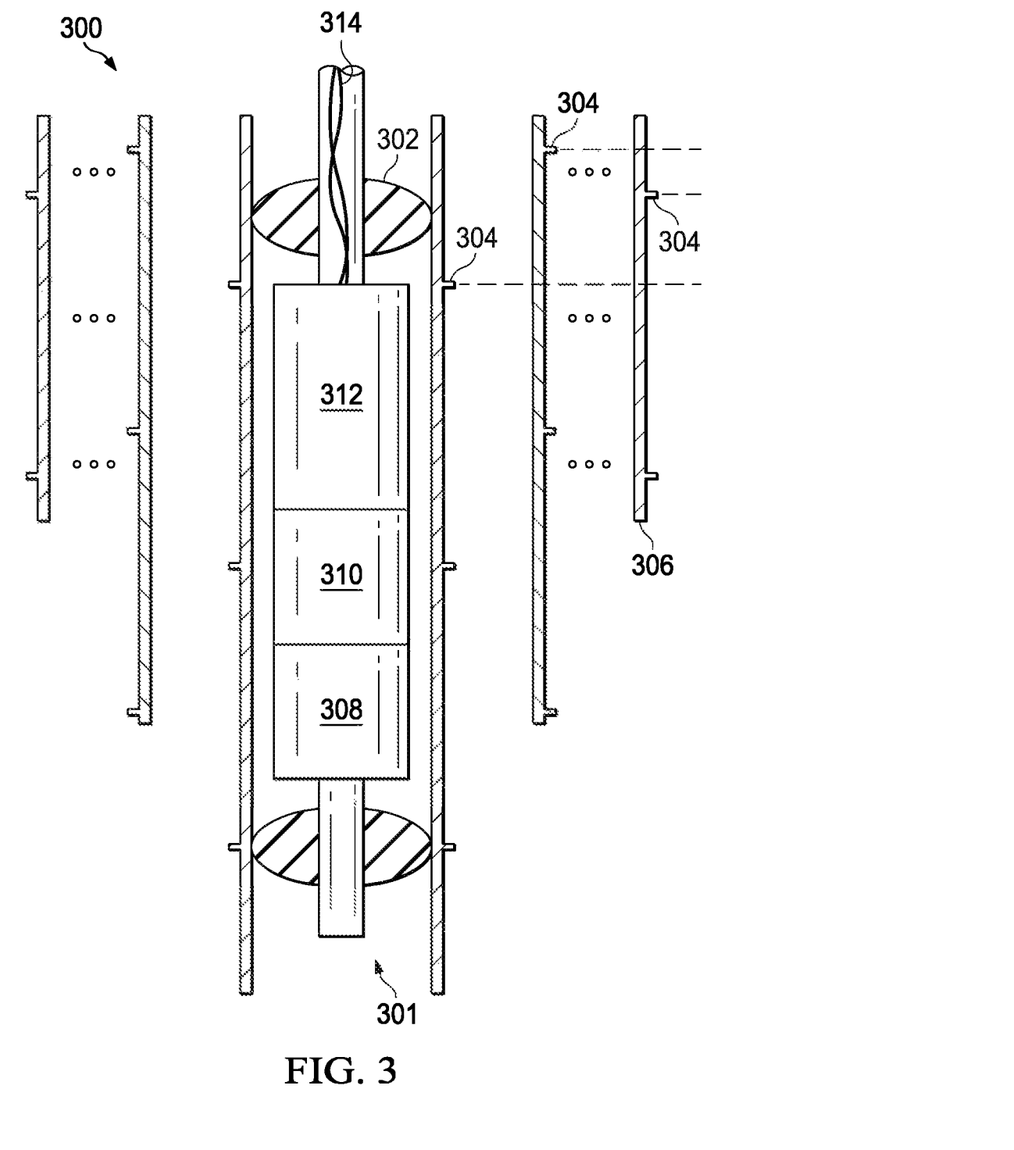
FIG. 3 is a functional schematic view of an illustrative tool for determining permeability based on collar responses.

FIG. 3 is a functional schematic view of an illustrative tool 301 for determining permeability based on collar responses. The tool 301 includes an eddy current sonde module 308, a sensor module 310, and a communication and processing module 312. The sonde module 308 includes a transmitter to transmit a primary electromagnetic field when in the casing string 306. As illustrated, the tool 301 is within three concentric casing strings (a "triple-pipe" scenario), but the tool 301 may be used with any number of casing strings 306. In some cases, the number of casing strings 306 may not be known because of the age of the well, the inaccessibility or incompleteness of records, and the like. The sonde module 308 also includes a receiver to receive collar responses including a secondary electromagnetic field produced, in response to the primary field, by the collars 304.

Figure 5:
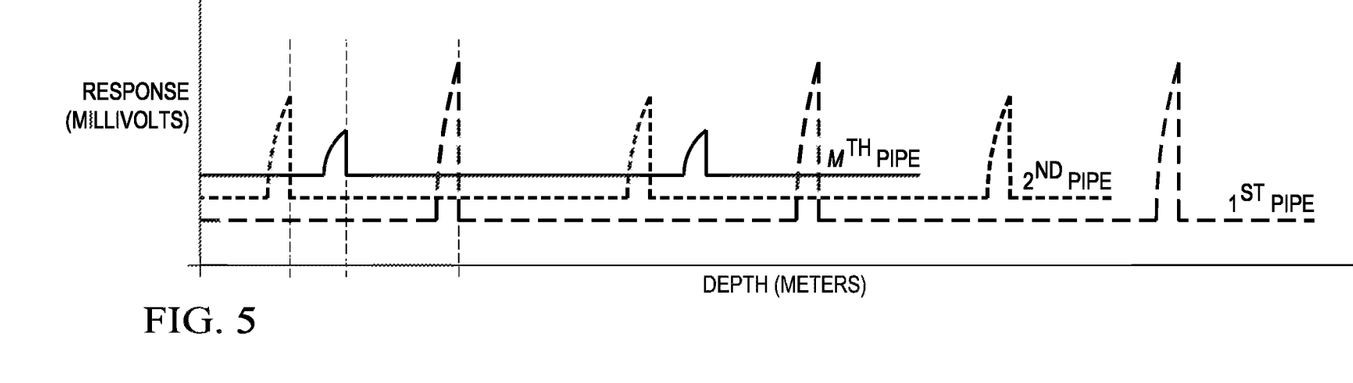
FIG. 5 is an illustrative graph of non-differential responses.

FIG. 5 illustrates the manner in which the collar responses for each pipe contribute to the overall received signal. Specifically, the magnitude of the response is shown as a function of increasing distance from the surface in a vertical well (increasing depth), with peaks corresponding to the collar positions on the various casing strings. The largest responses correspond to the collars of the first, or innermost, casing string because there is less dissipation or spreading of the signal. Similarly, the smallest responses correspond to the collars of the third, or outermost, collars because there is more signal dissipation. However, even for the outermost casing, the response is still large enough to isolate and measure.

Returning to FIG. 3; the sensor module 310 includes depth sensors, temperature sensors, pressure sensors, and the like that collect downhole measurements as a function of time. The data collected by these sensors may be associated with the signals transmitted and received by the sonde 308 module. For example, the received signal may be associated with downhole data corresponding to the time the signal was received. When associated, the collected measurements may provide context for interpreting and processing the signals.

The communication and processing module 312 includes a processor, memory, and communication hardware for processing operations, storing data, and enabling communications between the tool 301 and the surface. The communication channel between the tool 301 and the surface may be wired or wireless. The hardware on the tool 301 may be powered from the surface using a wireline 314 as a conduit, and the tool 301 itself may be centered within the borehole by centralizers 302. By conveying the tool 301 along the borehole, the permeability of the casings 306 may be determined by the processor and a representation of the casing 306 based on the permeability may be output for display by the processor as described with respect to FIG. 4.

Figure 4:
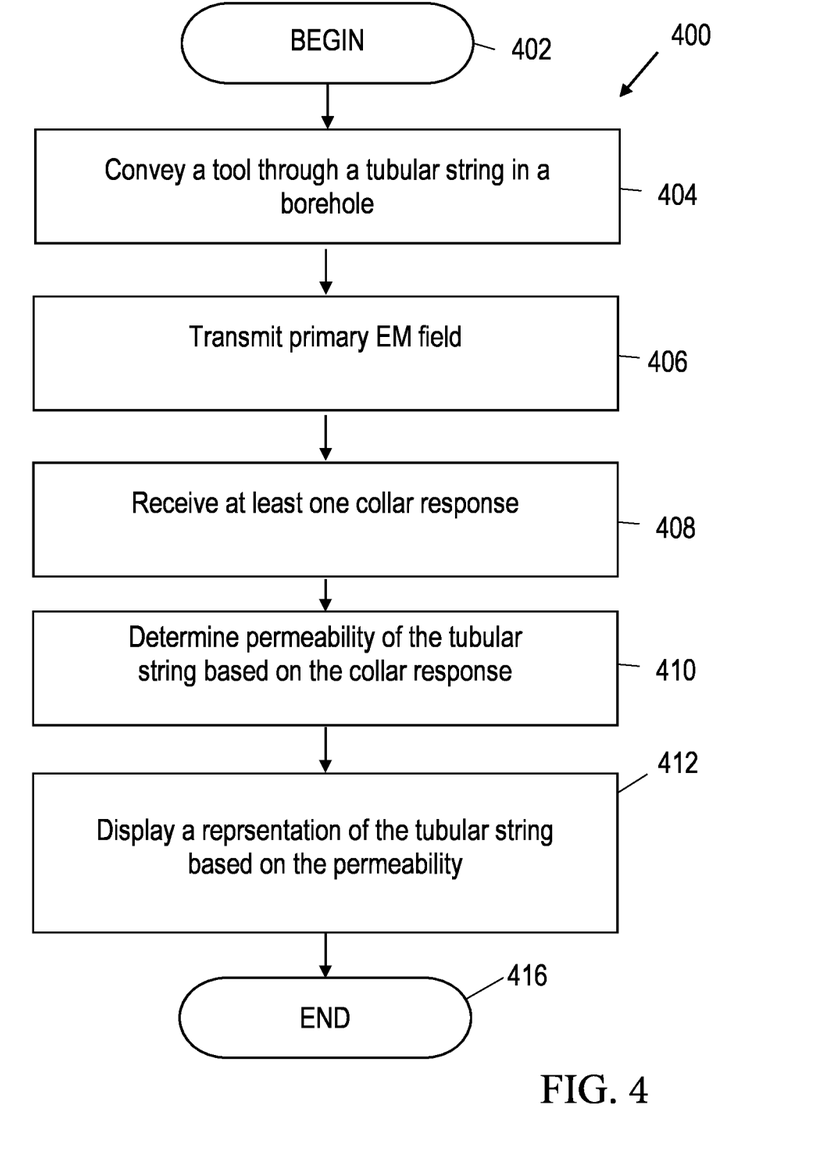
FIG. 4 is a flow diagram of an illustrative method for determining permeability based on collar responses.

FIG. 4 is a flow diagram of an illustrative method 400 of determining permeability based on collar responses beginning at 402 and ending at 416. At 404, the tool is conveyed through one or more concentric casings in a borehole. The number of casings or collars need not be known in advance. For vertical wells, the tool may be conveyed by wireline, and for horizontal wells, the tool may be conveyed by tractor. While being conveyed, the tool maybe rotated to different azimuthal orientations to take measurements at different depths and orientations.

At 406, a primary electromagnetic field is transmitted. The field, or signal, may be transmitted by a transmitter or transceiver coil on the tool. If the collars can be predictably located at certain depths, a depth sensor on the tool may alert the transmitter to fire at particular depths. If the collars cannot be predictably located, the tool may transmit based on other criteria measured by sensors on the tool. For example, particular temperature and/or pressure values may alert the transmitter to fire.

At 408, at least one collar response is received. The collar response includes a secondary electromagnetic field produced in response to the primary field by at least one collar. Typically, responses from different collars will present in the received signal, and these responses are isolated in order to measure and record their magnitude in context with other downhole data collected by sensors for a particular time, depth, and/or azimuth.

At 410, the permeability of the tubular string is determined based on the collar responses. In general, to determine the permeability the collar response is compared with responses in a model or simulation. The permeability of the simulation is adjusted until the simulated response is sufficiently similar to the collar response. Next, the permeability of the adjusted simulation is selected as the permeability of the casing corresponding to the collar response, and if necessary, another iteration of the comparison and adjustment process is performed. If there is a known relationship between the casing permeability and the collar permeability, then the selected permeability is adjusted according to this relationship as well. As a separate embodiment, a forward model for simulating the response may be iteratively updated until good agreement is achieved between the measured and simulated responses.

Figure 6:
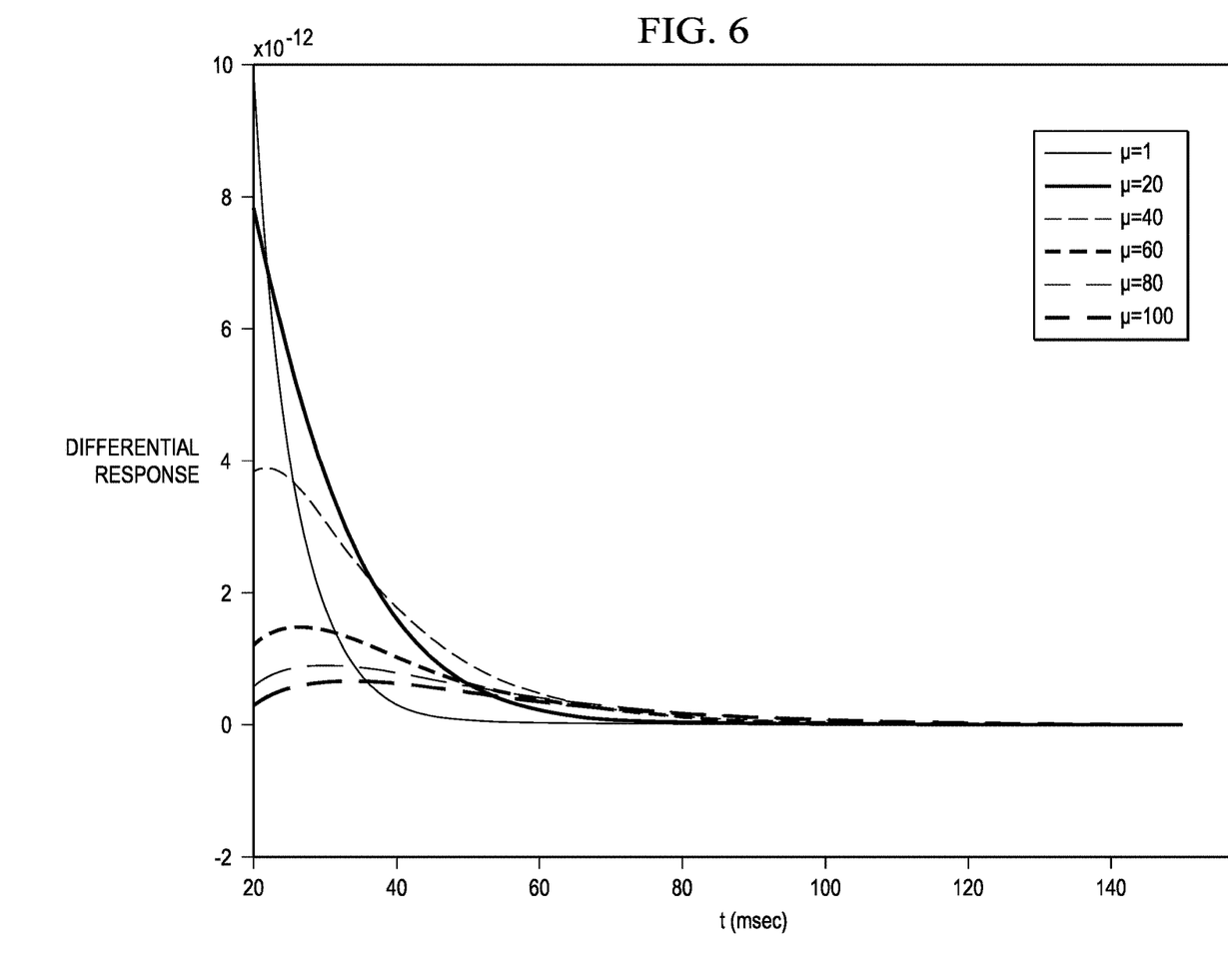
FIG. 6 is an illustrative graph of differential responses in a single pipe scenario; aid
Figure 7:
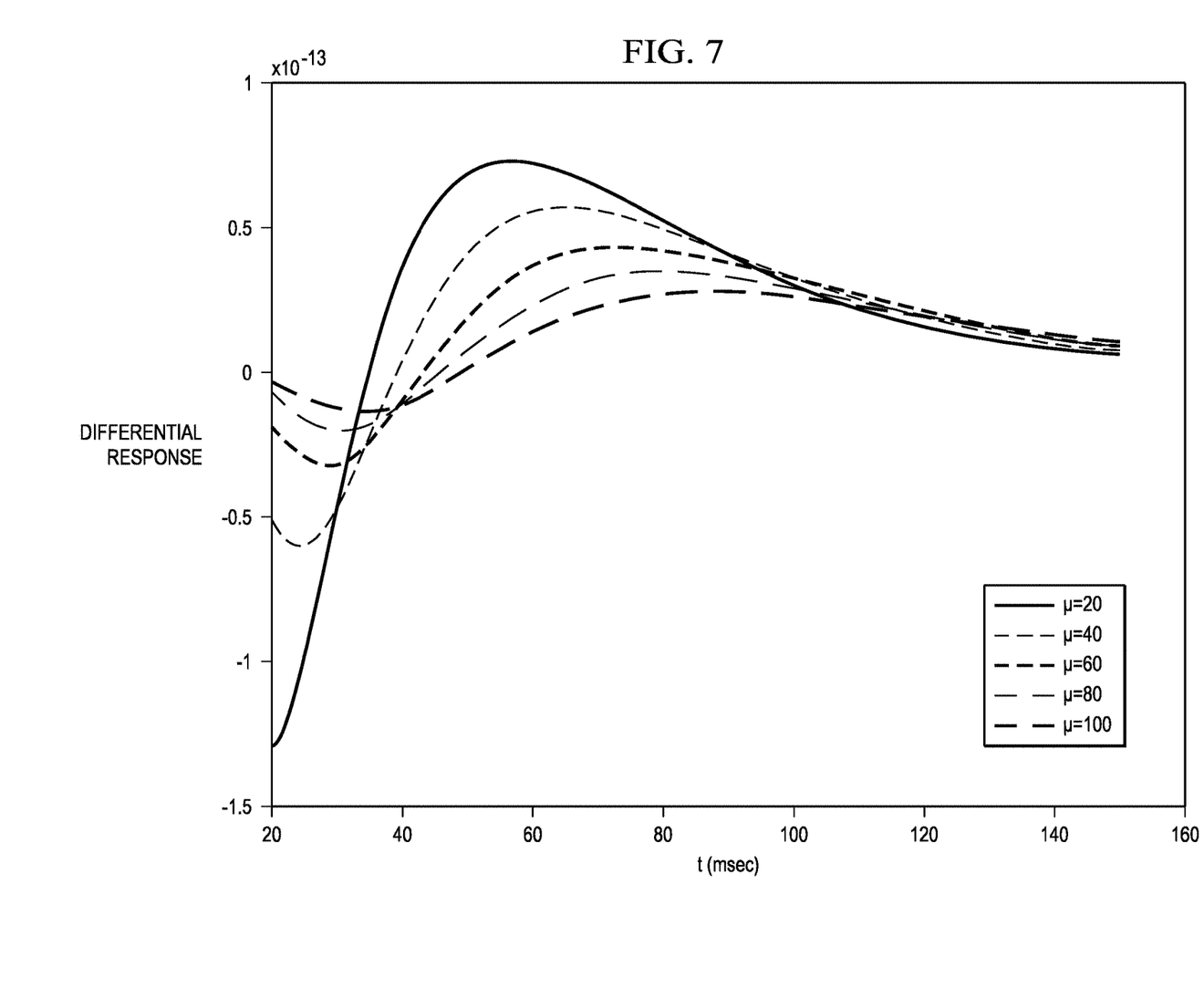
FIG. 7 is an illustrative graph of differential responses in a double pipe scenario.

Additionally, determining the permeability may include calculating differential responses, at various permeabilities, between the simulated collar response of the tubular string and a simulated non-collar response of the tubular string without the collar. Specifically, the magnitude of the peak of the simulated non-collar response is subtracted from the magnitude of the peak of the simulated collar response. Next, the absolute value of the difference is determined. This process is repeated over multiple permeability values, which are commonly denoted with the symbol μ. In this way, a library of collar responses may be built for comparison purposes. FIG. 6 illustrates a graph of the differential responses as a function of time. Specifically, the differential responses using μ values of 1, 20, 40, 60, 80, and 100 are shown for a single pipe with an outer diameter of 5 inches, a thickness of 0.362 inches, and a collar length of 5 inches. Over time the differential responses converge, but are well differentiated before convergence. As such, the actual collar response can be compared to the simulated collar response during a time window in which the differential responses do not converge. According to FIG. 6, the comparison may occur before 60 milliseconds. However, FIG. 7 illustrates the differential responses in a double-pipe scenario for μ values of 20, 40, 60, 80, and 100 for pipes with outer diameters of 5 inches and 9 ⅝ inches, thicknesses of 0.362 inches, and collar lengths of 5 inches. Here, the comparison may occur between 40 and 80 milliseconds. Returning to FIG. 4, the actual collar responses at these times may be extracted from the received signal at 408.

For a case where the pipe on one side of the collar is a different material or permeability than the pipe on the other side of the collar, calculating the differential responses may include calculating two differential responses. The first set of differential response may be for the upper pipe above the collar, and the second set of differential responses may be for the lower pipe below the collar. In a similar fashion, portions of the same pipe may include different materials or permeability leading to determination of a separate set of differential responses.

In at least one embodiment, the permeability of an innermost casing is determined first. Next, this permeability is used during the determination of the permeability of the next innermost casing. In this way, permeabilities of the casings are determined from innermost to outermost. For a case where multiple collar responses are recorded, determining the permeability may include determining the permeability or the pipe based on an average magnitude of collar responses.

At 412, a representation of the casing is displayed based on the permeability. Specifically, the thickness and corrosion characteristics of the casino (both of which are a function of the permeability) may be displayed to a user. Different colors, lines, and symbols may identify different characteristics on the display. By repeating and displaying the measurements over time, the corrosion of the casing may be monitored.

Determining casing, or any tubing, permeability based on collar responses has several advantages. First, the collar responses are stronger than non-collar responses. As such, the determination is more accurate. Second, by not ignoring the collar, a more complete set of data is used in the determination. Again, this makes the determination more accurate. Accordingly, the thickness and corrosion estimates of the casing are more accurate as well.

In at least one embodiment, a method for determining tubing permeability includes conveying a tool through a tubular string in a borehole. The tool includes a transmitter that transmits a primary electromagnetic field and a receiver that receives at least one collar response. The collar response includes a secondary electromagnetic field produced in response to the primary field by a collar in the tubular string. The method further includes determining a permeability of at least one portion of the tubular string based on a magnitude of the at least one collar response. The method further includes displaying a representation of the at least one portion of the tubular string based on the permeability.

In another embodiment, an apparatus for determining tubing permeability includes a transmitter to transmit a primary electromagnetic field when in a tubular string. The apparatus further includes a receiver to receive at least one collar response including a secondary electromagnetic field produced in response to the primary field by a collar in the tubular string. The apparatus further includes a processor to determine a permeability of at least one portion of the tubular string based on a magnitude of the at least one collar response.

In another embodiment, a system for determining tubing permeability includes depth sensors to determine a depth when in a tubular string. The system further includes an eddy current sonde including a transmitter to transmit a primary electromagnetic field when in the tubular string and a receiver to receive at least one collar response including a secondary electromagnetic field produced in response to the primary field by a collar in the tubular string. The system further includes a communication module including a processor to determine a permeability of at least one portion of the tubular string based on a magnitude of the at least one collar response and memory to store collar response data.

The following features may he incorporated into the various embodiments. Corrosion of the at least one portion of the tubular string may he monitored by determining a thickness of the at least one portion based on the permeability. Differential responses, at various permeabilities, between a simulated collar response of the tubular string and a simulated non-collar response of the tubular string without the collar may be calculated. The collar response may be compared to the simulated collar response during a time window in which the differential responses do not converge. A permeability corresponding to the simulated collar response most similar to the collar response during the time window may be selected as the permeability of the at least one portion of the tubular string. Two differential responses may be calculated, one for an upper tubular portion above the collar and one for a lower tubular portion below the collar, the upper and lower portions including different permeabilities. The at least one collar response may be extracted from a signal received by the receiver. The receiver may receive collar responses from collars located at different radial distances from the tool. The permeability of at the least one portion of the tubular string may be determined based on an average magnitude of more than one collar response. A processor may output for display a representation of the at least one portion of the tubular string based on the permeability. The representation may show thickness as a function of permeability along the length of the borehole. The representation may show thickness as a function of permeability around the azimuth of the borehole.

A processor may calculate differential responses, at various permeabilities, between a simulated collar response of the tubular string and a simulated non-collar response of the tubular string without the collar. A processor may compare the collar response to the simulated collar response during a time window in which the differential responses do not converge. A processor may extract the at least one collar response from a signal received by the receiver. A receiver may receive collar responses from collars located at different radial distances from the tool. A processor may determine the permeability of at the least one portion of the tubular string based on an average magnitude of more than one collar response.

While the present disclosure has been described with respect to a limited number of embodiments, those skilled in the art will appreciate numerous modifications and variations therefrom. It is intended that the appended claims cover all such modifications and variations.

What is claimed is:

1. A method for determining tubing permeability comprising:
   conveying a tool through a tubular string in a borehole, the tool comprising a transmitter that transmits a primary electromagnetic field, the tool further comprising a receiver that receives at least one collar response comprising a secondary electromagnetic field produced in response to the primary field by a collar in the tubular string;
   determining a permeability of at least one portion of the tubular string based on a magnitude of the at least one collar response, wherein determining the permeability further comprises calculating differential responses, at various permeabilities, between a simulated collar response of the tubular string and a simulated non-collar response of the tubular string without the collar;
   monitoring a thickness of the at least one portion of the tubular string based on the permeability to identify corrosion in the at least one portion of the tubular string which prevents failure of the tubular string.

2. The method of claim 1, further comprising monitoring corrosion of the at least one portion of the tubular string by determining a thickness of the at least one portion based on the permeability.

3. The method of claim 1, wherein determining the permeability further comprises comparing the collar response to the simulated collar response during a time window in which the differential responses do not converge.

4. The method of claim 3, wherein determining the permeability further comprises selecting a permeability corresponding to the simulated collar response most similar to the collar response during the time window as the permeability of the at least one portion of the tubular string.

5. The method of claim 1, wherein calculating differential responses comprises calculating two differential responses, one for an upper tubular portion above the collar and one for a lower tubular portion below the collar, the upper and lower portions comprising different permeabilities.

6. The method of claim 1, wherein determining the permeability further comprises extracting the at least one collar response from a signal received by the receiver.

7. The method of claim 1, wherein the receiver receives collar responses from collars located at different radial distances from the tool.

8. The method of claim 1, wherein determining the permeability comprises determining the permeability of at the least one portion of the tubular string based on an average magnitude of more than one collar response.

9. An apparatus for determining tubing permeability comprising:
   a transmitter to transmit a primary electromagnetic field when in a tubular string;
   a receiver to receive at least one collar response comprising a secondary electromagnetic field produced in response to the primary field by a collar in the tubular string; and
   a processor to determine a permeability of at least one portion of the tubular string based on a magnitude of the at least one collar response;
   wherein the processor calculates differential responses, at various permeabilities, between a simulated collar response of the tubular string and a simulated non-collar response of the tubular string without the collar; and
   wherein the processor monitors a thickness of the at least one portion of the tubular string based on the permeability to identify corrosion in the at least one portion of the tubular string which prevents failure of the tubular string.

10. The apparatus of claim 9, wherein the processor outputs for display a representation of the at least one portion of the tubular string based on the permeability.

11. The apparatus of claim 10, wherein the representation shows thickness as a function of permeability along the length of the borehole.

12. The apparatus of claim 11, wherein the representation shows thickness as a function of permeability around the azimuth of the borehole.

13. The apparatus of claim 9, wherein the processor compares the collar response to the simulated collar response during a time window in which the differential responses do not converge.

14. The apparatus of claim 9, wherein the processor extracts the at least one collar response from a signal received by the receiver.

15. The apparatus of claim 9, wherein the receiver receives collar responses from collars located at different radial distances from the tool.

16. The apparatus of claim 9, wherein the processor determines the permeability of at the least one portion of the tubular string based on an average magnitude of more than one collar response.

17. A system for determining tubing permeability comprising:
   depth sensors to determine a depth when in a tubular string;
   an eddy current sonde comprising a transmitter to transmit a primary electromagnetic field when in the tubular string and a receiver to receive at least one collar response comprising a secondary electromagnetic field produced in response to the primary field by a collar in the tubular string; and
   a communication module comprising a processor to determine a permeability of at least one portion of the tubular string based on a magnitude of the at least one collar response and memory to store collar response data, wherein determine the permeability further comprises calculating differential responses, at various permeabilities, between a simulated collar response of the tubular string and a simulated non-collar response of the tubular string without the collar and
   wherein the processor monitors a thickness of the at least one portion of the tubular string based on the permeability to identify corrosion in the at least one portion of the tubular string which prevents failure of the tubular string.

* * * * *